Jan. 6, 1953     D. E. GAMBLE     2,624,436
SPRAG TYPE CLUTCH
Filed Jan. 2, 1947
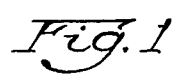
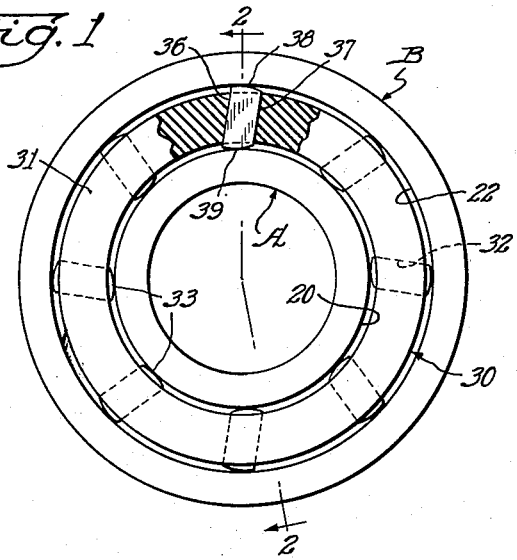
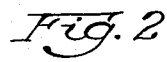
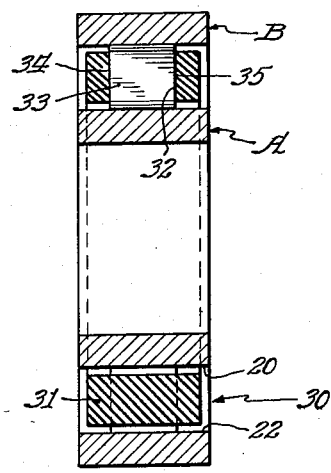
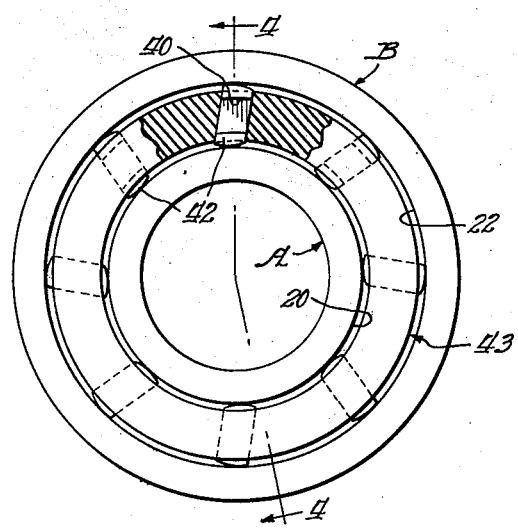
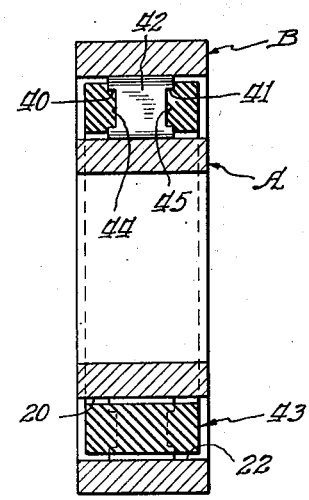
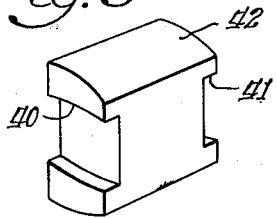
Inventor:
David E. Gamble Patented Jan. 6, 1953

2,624,436

UNITED STATES PATENT OFFICE 2,624,436

SPRAG TYPE CLUTCH

David E. Gamble, Chicago, Ill., assignor to Borg-Warner Corporation, Chicago, Ill., a corporation of Illinois Application January 2, 1947, Serial No. 719,727

12 Claims. (Cl. 192—45.1)

My invention relates to improvements in one-way clutches and particularly to improvements in that type of clutch which will permit the independent movement in one direction of one of the members which it is designed to couple while causing an interdependent movement of the coupled members in the opposite direction.

An object and accomplishment of the invention is to improve the construction of one-way clutches as contemplated herein with respect to efficiency of operation and economy in their manufacture; and to this end, a feature of the invention is to provide a one-way clutch generally comprising an annular sprag carrier formed of a resilient material having characteristics similar to those of rubber, said sprag carrier being provided with a plurality of recesses adapted to receive suitable sprags, said sprag carrier also being adaptable to be operatively disposed between a driving and driven member, and the resilient characteristics of the sprag carrier provide a suitable spring-like tension against the sprag when assembled in its operative position.

The invention seeks as a principal object and accomplishment to provide a one-way clutch such as contemplated herein and characterized by a combination of parts arranged and adapted to provide a compact assembly which will successfully combine the factors of structural simplicity, efficiency and durability, and yet be economical to manufacture.

The invention further contemplates the provision of a simply constructed one-way clutch that is capable of being made of small dimensions, that is made of few parts and that may be quickly assembled and which will operate instantaneously upon reversal of the rotation of the driving member.

Another object of the invention is to provide a one-way clutch of the above character whereby a uniform pressure against the sprags is effected to effectively provide uniform loading.

Additional objects, features and advantages of the invention disclosed herein will be apparent to persons skilled in the art after the construction and operation are understood from the within description.

It is preferred to accomplish the various objects of this invention and to practice the same in substantially the manner hereinafter fully described and as more particularly pointed out in the appended claims, reference being had to the accompanying drawing which forms a part of this specification, wherein:

Fig. 1 is a side elevational view of a one-way clutch embodying the present invention with parts thereof shown in section to more clearly show the construction thereof;

Fig. 2 is a sectional view of the one-way clutch depicted in Fig. 1 and taken substantially on the plane of the line 2—2 of Fig. 1;

Fig. 3 is a side elevational view of a modified structure of a one-way clutch embodying the present invention with parts thereof shown in section to better illustrate the construction thereof;

Fig. 4 is a sectional view of the one-way clutch depicted in Fig. 3 and taken substantially on the plane of the line 4—4 in Fig. 3; and Fig. 5 is a perspective view of a sprag employed in the one-way clutch depicted in Fig. 3.

The drawing is to be understood as being more or less of a schematic character for the purpose of illustrating or disclosing typical or preferred forms of the improvements contemplated herein and in the drawing like reference characters identify the same parts in the several views.

I have illustrated the present one-way clutch assembled in an operative position between a driven member which I have designated in its entirety by the letter A and a driving member which I have designated in its entirety by the letter B. In some applications, it may be advantageous and preferable to have the driving and driven elements in reversed positions.

As shown, the driven member A is provided with a smooth cylindrical peripheral surface 20 adapted to be employed as an inner race for the one-way clutch to be hereinafter described in detail.

The driven member B is provided with a smooth cylindrical surface 22 concentrically arranged in spaced relationship with the race 20 and adapted to form an outer race for the one-way clutch.

It will be observed that the arrangement of the one-way clutch to be hereinafter described in detail is such as to effectively couple the driving and driven members in one direction of operation and to release these members when the direction of operation is reversed so that either the driving member or the driven member may be rotated independently of the other member.

Suffice it to say, since the invention is not particularly concerned with the precise construction of the driving and driven members generally, they will not be further described in detail. It is to be understood that details of construction of these members may be modified to suit particular conditions, and I do not wish to be limited to the details of construction of these elements as set forth.

Having thus described the general environment surrounding the one-way clutch with which the present invention is particularly concerned the specific construction and the cooperating functions of the parts of said one-way clutch will now be described in detail.

In the exemplary embodiment of the invention depicted in Figs. 1 and 2, the one-way clutch assembly is designated in its entirety by the numeral 30 and comprises generally, a single annular sprag carrier 31 formed of suitable resilient material having characteristics similar to those of rubber, said carrier being provided with a plurality of suitable apertures or openings 32 each being adapted to receive a sprag 33, and the resilient characteristics of the sprag carrier functioning to cause a spring like tension against the sprag when assembled in its operative position between the driving member B and the driven member A.

It is notable that the apertures or openings 32 are so constructed with the transverse sides thereof at predetermined angles for engagement with the sprags as to restrict rotation of the sprag when assembled in its operative position.

In accordance with this invention, the sprags 33 are prismatic in section having straight parallel sides 36 and 37 and a top 38 and a bottom 39, said top and bottom being formed on circular arcs struck about centers spaced widthwise of the sprags so that the diagonal length in one direction is greater than that in other direction, thereby to cause the wedging angle to increase as the grip between the driving and driven members and the sprags tightens which will increase the torque capacity of the clutch.

The transverse walls of the apertures or openings 32 are non-radial so that the sprags 33 normally lie at angles to radii struck through the center of the driven member as shown in Fig. 1 and when tilted in this position will permit clockwise rotation of the driving member B relative to the driven member A. If the driving member B should attempt to turn counterclockwise relative to the driven member A or if the driven member A should overrun the driving member B, the sprags 33 will be caused to lock to a more nearly radial position and will bind against the races 20 and 22 to hold the driven and driving members against rotation with respect to each other.

It is notable that the top 38 and the bottom 39 of the sprags engage the races 22 and 20, respectively, in such a way that when the driving member B is rotated counterclockwise relative to the driven member A, the sprags tend to rotate into a position in which they wedgingly engage the races to prevent relative rotation between the driven and driving members. It is to be understood that the race of the driving member B will be free to rotate in a clockwise direction as noted above, but if the driven member A should tend to overrun the driving member B in a clockwise direction the engagement of the top 38 and the bottom 39 of the sprags 33 with the respective races will tilt the sprags and force them into tight engagement with the races thereby locking the races against relative rotation.

It will be observed that the one-way clutch contemplated herein may be quickly assembled by merely inserting the sprags in their respective recesses and placing the assembled clutch in its proper operative position between the driving and driven members. With this construction and arrangement of parts it can be seen that worn sprags may be quickly replaced by removing the one-way clutch from its operative position and inserting new sprags into the recesses. In like manner, the sprag carrier may be easily and quickly replaced by removing the one-way clutch from its operative position and removing the sprags from the sprag carrier, and if they are in good condition, they may be replaced into the recesses of a new sprag carrier.

It has been found particularly desirable to provide a uniform resilient pressure against the sprags, which will cause the proper seating thereof and hold them in their operative position. Moreover, it is desirable to provide movement of the sprags slightly at angles with respect to a line parallel to the axis of the driving and driven members to facilitate proper seating of the top and bottom surfaces of the sprags with their respective races. This feature is advantageously accomplished in the present invention by the employment of the sprag carrier, as contemplated herein. The resilient characteristics of the sprag carrier will permit slight movement of the sprags at angles with respect to a line parallel to the axis of the driving and driven members, thereby facilitating the proper seating of the sprags with respect to the driving and driven members. Moreover, the resilient characteristics of the sprag carrier will hold the sprags in their operative position so that they will operate instantaneously upon reversal of the rotation of the driving member or if the driven member A should overrun the driving member B.

The present clutch may be made in comparatively small dimensions. Heretofore, with the arrangements found in the prior art, it was not practical to construct a clutch of small dimensions as found in the present invention, and yet have the advantages found in the present invention.

The construction of the one-way clutch illustrated in Fig. 3 is substantially similar in most respects to that shown in Figs. 1 and 2 and parts therein corresponding to like parts in Figs 1 and 2 have been indicated by the same numerals.

In some adaptations it may be advantageous and desirable to provide means whereby the sprags are retained in the sprag carrier in such a way that the sprags will not fall out of the carrier when the carrier is removed from its operative position between the driving and driven members. This feature would be particularly advantageous in facilitating shipping of the assembled unit.

In the design shown in Figs. 3, 4 and 5 the above mentioned feature is admirably accomplished by the provision of recesses 40 and 41 in the ends of the sprag 42 (Fig. 5), the balance of the sprag being of substantially the same construction as hereinbefore described with respect to the design shown in Figs. 1 and 2. The sprag carrier 43 possesses advantages of and is also of substantially the same design as hereinbefore described with respect to the sprag carrier shown in Figs. 1 and 2 except that the sprag carrier 43 is provided with protuberances 44 and 45 adaptable to be received into recesses 40 and 41 of the sprags 42, respectively, thereby to hold the sprags in assembled relationship with the sprag carrier. In view of the resilient nature of the sprag carrier 43, the protuberances 44 and 45 engage the recesses 40 and 41 with a snap action upon insertion of the sprags 42 in the openings of the sprag carrier 43.

From the foregoing disclosure, it can be seen that I have provided a one-way clutch which efficiently fulfills the objects hereinbefore set forth and provides numerous advantages which may be summarized as follows:

(1) Structurally simple, efficient and durable;

(2) Economical to manufacture and readily adaptable to mass production manufacture;

(3) Capable of being made in small dimensions; and (4) Quick acting.

While I have illustrated a preferred embodiment of my invention, many modifications may be made without departing from the spirit of the invention, and I do not wish to be limited to the precise details of construction set forth, but desire to avail myself of all changes within the scope of the appended claims.

I claim:

1. A sprag clutch assembly comprising a driving member and a driven member in concentric spaced relationship, a one-way driving connection between said members comprising an annular carrier member formed of suitable resilient material having elastic characteristics similar to rubber and having a plurality of apertures extending transversely therethrough, and a plurality of sprags having generally rectangular leading and trailing faces and adapted to be received respectively in said recesses and to be operatively carried by said carrier when in assembled relationship with the sides of the apertures enclosing the sprags, said sprag carrier exerting elastic pressure against said leading and trailing faces of the sprags when assembled in operative position between said driving and driven members.

2. A carrier and sprag assembly for one-way clutches comprising an annular carrier member formed of resilient material having the elastic characteristics of rubber and having a plurality of apertures extending transversely therethrough, and a plurality of sprags enclosed by the sides of the apertures and arranged in said apertures with their radial inner and outer ends extending beyond the inner and outer peripheries of said annular carrier member.

3. A cage construction for use in a one-way clutch assembly having a driving member and a driven member in concentric spaced relationship and comprising a sprag carrier adapted to be disposed between said members and formed of a resilient material body and having a plurality of apertures extending transversely therethrough and adapted to receive sprags, sides of said apertures being adapted to enclose the sprags and the adjacent body material flexing, due to the resiliency of the material, to exert resilient pressure against the sprags to tilt the sprags into engagement with said members when assembled in operative position between said driving and driven members.

4. A carrier and sprag assembly for one-way clutches comprising an annular sprag carrier formed of resilient material having the elastic characteristics of rubber and having a plurality of apertures extending transversely therethrough, a plurality of sprags each received in one of said apertures with its radial inner and outer edges extending beyond the peripheries of said elastic annulus and also operatively carried by said carrier when in assembled relationship, the sides of said apertures enclosing said sprags and each of said sprags being prismatic in section and having its radially inner and outer ends provided with surfaces formed on circular arcs struck about centers spaced widthwise of the sprags so that the diagonal length in one direction is greater than that in the other direction.

5. A carrier and sprag assembly for one-way clutches comprising a resilient annular carrier member of non-metallic elastic material having a plurality of generally radial apertures extending therethrough, a plurality of sprags each adaptable to be received in one of said apertures with its radial inner and outer edges extending beyond the respective peripheries of said elastic annulus and operatively carried by said carrier when in assembled relationship, sides of said apertures enclosing said sprags, said sprags being prismatic in section and having curved end surfaces formed on circular arcs struck about centers spaced widthwise of the sprags so that the diagonal length in one direction is greater than that in the other direction, and means on said carrier cooperating with means on said sprags to maintain said sprags in assembled relationship with said carrier.

6. A sprag assembly for a one-way engaging device comprising a plurality of tiltable sprags adapted to wedge between two opposed races on tilting of the sprags; and a carrier having a plurality of apertures therethrough receiving said sprags and positioning said sprags in spaced relation to each other, adjacent sides of said apertures and sprags being provided with interfitting projections being of resilient material for maintaining said sprags in said apertures, said recesses and projections permitting insertion of said sprags into said apertures by snap action and for tilting the sprags in a race engaging direction when the assembly is positioned between two opposed races.

7. In a sprag and carrier assembly for a one-way engaging device, the combination of a series of sprags having curved end surfaces adapted to wedgingly engage two opposed races on tilting of the sprags; and a sprag carrier comprising a resilient material body having apertures therethrough receiving said sprags and positioning said sprags in spaced relation to each other, the sides of said apertures enclosing said sprags and the adjacent body material flexing, due to the resiliency of the material, to urge the sprags to tilt in a race-engaging direction when the assembly is positioned between two opposed races.

8. A sprag assembly for a one-way engaging device comprising a sprag carrier having a plurality of apertures therethrough; and tiltable sprags in said apertures, said apertures being spaced from each other to position said sprags in predetermined spaced relation to each other, sides of said apertures and sides of said sprags being provided with mating recesses and projections for holding the sprags in said apertures, said projections being formed of resilient material for permitting insertion of the sprags into the apertures by snap action.

9. A sprag assembly for a one-way engaging device comprising a carrier formed of a resilient material body having therein a plurality of spaced apertures extending therethrough; and a plurality of sprags in said apertures, said sprags having curved end surfaces adapted to grip two opposed races on tilting of the sprags, said apertures spacing said sprags in predetermined relation to each other, the sides of said apertures enclosing said sprags, and portions of the aperture sides being displaced against the yielding action of said carrier when the sprags are inserted in said apertures for maintaining said sprags in assembly with said carrier.

10. In a one-way engaging device, two opposed races, a series of tiltable sprags each having two curved end surfaces for wedgingly engaging the races on tilting of the sprags, and a carrier comprising a resilient material body having apertures therethrough for receiving said sprags and positioning them in spaced relation to each other, the sides of each of said apertures enclosing one of said sprags and the adjacent body material flexing due to the resiliency of the material for urging said sprags to tilt into wedging engagement with said races, sides of said apertures and said sprags being provided with interfitting recesses and projections for maintaining the sprags in said apertures and permitting insertion of the sprags into the apertures by snap action.

11. In a sprag and carrier assembly for a one-way engaging device, a series of tiltable sprags having curved end surfaces adapted to be interposed between a pair of opposed races and adapted to be tilted into wedging engagement with the races; and a carrier comprising a resilient material body having openings therein for receiving said sprags for holding the sprags spaced from each other, sides of each of said openings enclosing one of said sprags and the adjacent body material flexing due to the resiliency of the material to urge the sprags to tilt in a race engaging direction when the assembly is positioned between two opposed races, and sides of said openings and sides of said sprags being provided with interfitting recesses and projections for maintaining said sprags in said openings and permitting insertion of said sprags into said openings by snap action.

12. In a one-way engaging device, two opposed races; a series of tiltable sprags having curved end surfaces interposed between said races and adapted to wedge between the races on tilting of the sprags; and a sprag retaining member comprising a resilient material body having apertures therethrough for receiving the sprags and holding the sprags in predetermined spaced relation from each other, and the sides of each of said apertures enclosing one of said sprags and the adjacent body material flexing due to the resiliency of the material for yieldingly urging the sprags into wedging engagement with the races.

DAVID E. GAMBLE.

REFERENCES CITED

The following references are of record in the file of this patent:

UNITED STATES PATENTS

| Number | Name | Date |
|---|---|---|
| 1,923,283 | Stokes | Aug. 22, 1933 |
| 2,035,925 | Seamark | Mar. 31, 1936 |
| 2,366,843 | Dodge et al. | Jan. 9, 1945 |
| 2,386,013 | Swenson | Oct. 2, 1945 |
| 2,427,120 | Blair | Sept. 9, 1947 |
| 2,428,968 | Gruenberg | Oct. 14, 1947 |
| 2,447,384 | Wolff | Aug. 17, 1948 |
| 2,520,004 | Gondek | Aug. 22, 1950 |